(12) United States Patent
Sugawara

(10) Patent No.: US 10,802,376 B2
(45) Date of Patent: Oct. 13, 2020

(54) LENS DRIVING DEVICE, CAMERA MODULE, AND CAMERA MOUNTING DEVICE

(71) Applicant: Masayoshi Sugawara, Tokyo (JP)

(72) Inventor: Masayoshi Sugawara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 104 days.

(21) Appl. No.: 16/306,049

(22) PCT Filed: May 31, 2016

(86) PCT No.: PCT/CN2016/084036
§ 371 (c)(1),
(2) Date: Nov. 30, 2018

(87) PCT Pub. No.: WO2017/206053
PCT Pub. Date: Dec. 7, 2017

(65) Prior Publication Data
US 2019/0294026 A1    Sep. 26, 2019

(51) Int. Cl.
*G03B 5/02*    (2006.01)
*G02B 7/09*    (2006.01)
(Continued)

(52) U.S. Cl.
CPC ............. *G03B 5/02* (2013.01); *G02B 7/09* (2013.01); *G02B 27/646* (2013.01); *G03B 5/04* (2013.01);
(Continued)

(58) Field of Classification Search
None
See application file for complete search history.

(56) References Cited

U.S. PATENT DOCUMENTS

2007/0280668 A1*   12/2007   Kubo ................... G03B 3/10
                                                         396/133
2009/0147340 A1*   6/2009   Lipton ................ G02B 27/646
                                                         359/230
(Continued)

FOREIGN PATENT DOCUMENTS

JP         2013-024938 A       2/2013
KR     10-20120118706 A      10/2012
(Continued)

OTHER PUBLICATIONS

International Search Report from International Application No. PCT/CN2016/084036 dated May 31, 2016.

*Primary Examiner* — Derek S. Chapel
(74) *Attorney, Agent, or Firm* — Brundidge & Stanger, P.C.

(57) ABSTRACT

An auto focus support section (13) of a lens driving device has a support body (41) and a reinforcing section (42). The support body has a fixed end (411) connected to an auto focus fixing section (12), free ends (413) connected to an auto focus movable section (11), and arms (412) connected to the fixed end and the free ends. The arms are made of an elastic material, with two hinge sections (412a, 412b) thinner than surrounding structures and axes orthogonal to the optical axis, that move together with the auto focus movable section towards the optical axis. The arms bend in opposite directions at the two hinge sections. The reinforcing sections are made of a material more rigid than the elastic material of the arms, and are disposed between the two hinge sections of the arms.

6 Claims, 16 Drawing Sheets

(51) Int. Cl.
    *G02B 27/64*     (2006.01)
    *G03B 5/04*     (2006.01)
    *G03B 13/36*     (2006.01)

(52) U.S. Cl.
    CPC ...... *G03B 13/36* (2013.01); *G03B 2205/0007* (2013.01); *G03B 2205/0015* (2013.01); *G03B 2205/0069* (2013.01)

(56) References Cited

U.S. PATENT DOCUMENTS

| | | | |
|---|---|---|---|
| 2011/0122267 A1* | 5/2011 | Ahn | G03B 5/00 |
| | | | 348/208.7 |
| 2013/0016427 A1 | 1/2013 | Sugawara | |
| 2015/0212336 A1* | 7/2015 | Hubert | G02B 27/646 |
| | | | 348/208.11 |
| 2016/0131923 A1* | 5/2016 | Hu | G02B 7/10 |
| | | | 359/557 |
| 2017/0131561 A1 | 5/2017 | Jung | |
| 2018/0348538 A1* | 12/2018 | Sugawara | G03B 5/06 |
| 2020/0033699 A1* | 1/2020 | Kim | G03B 5/06 |
| 2020/0041811 A1* | 2/2020 | Zhang | G02B 7/04 |

FOREIGN PATENT DOCUMENTS

| | | |
|---|---|---|
| KR | 10-1625608 B1 | 5/2016 |
| WO | 2011132920 A2 | 10/2011 |
| WO | 2015147603 A1 | 10/2015 |

\* cited by examiner

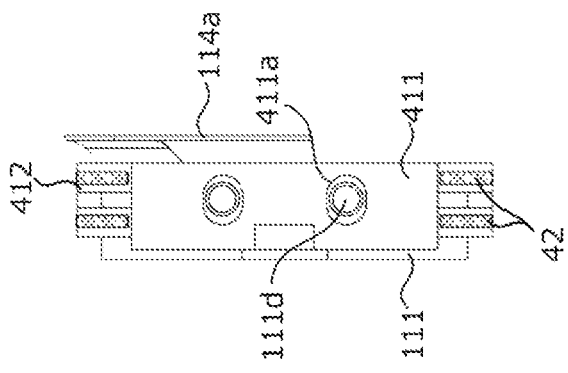
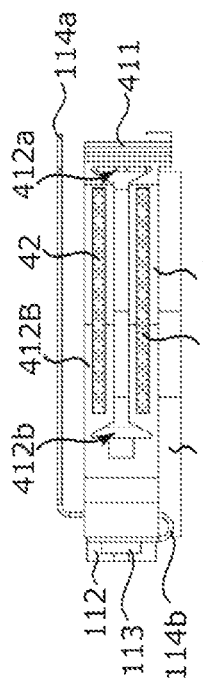
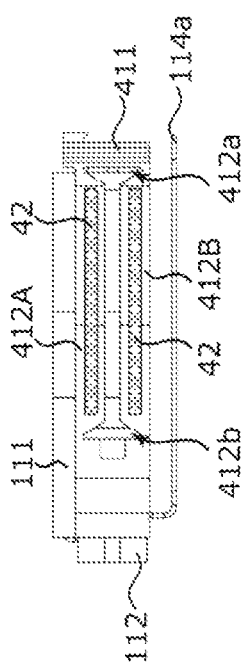
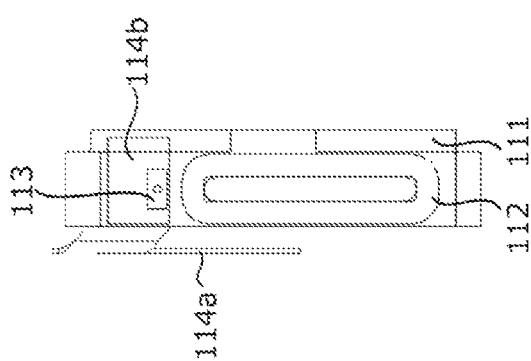

10,802,376 B2

LENS DRIVING DEVICE, CAMERA MODULE, AND CAMERA MOUNTING DEVICE

TECHNICAL FIELD

The present invention relates to a shake-correcting lens driving device, a camera module having a shake-correcting function, and a camera mounting device.

BACKGROUND ART

In general, a small-sized camera module is mounted in a mobile terminal such as a smartphone. In such a camera module, a lens driving device is employed (for example, PTL 1). The lens driving device has an auto-focusing function of automatically performing focusing for capturing a subject (hereinafter referred to as "AF (Auto Focus) function"), and a shake-correcting function (hereinafter referred to as "OIS (Optical Image Stabilization) function") of optically correcting shake (vibration) upon capturing an image to reduce the irregularities of the image.

A lens driving device having the auto-focusing function and the shake-correcting function includes an auto-focusing driving part (hereinafter referred to as "AF driving part") for moving the lens part in the optical axis direction, and a shake-correcting driving part (hereinafter referred to as "OIS driving part") for swaying the lens part in a plane orthogonal to the optical axis direction.

The AF driving part includes, for example, an auto-focusing coil part (hereinafter referred to as "AF coil part") disposed at a periphery of the lens part, an auto-focusing magnet part (hereinafter referred to as "AF magnet part") separated from the AF coil part in the radial direction, and an elastic supporting part (for example, a leaf spring) configured to elastically support an auto-focusing movable part (hereinafter referred to as "AF movable part") including the lens part and the AF coil part with respect to an auto focus fixing part (hereinafter referred to as "AF fixing part") including the AF magnet part for example. By moving the AF movable part in the optical axis direction with respect to the AF fixing part by utilizing a driving force of a voice coil motor composed of the AF coil part and the AF magnet part, automatic focusing is performed. It is to be noted that the AF fixing part may include the AF coil part, and the AF movable part may include the AF magnet part.

The OIS driving part includes, for example, a shake-correcting magnet part (hereinafter referred to as "OIS magnet part") disposed in the AF driving part, a shake-correcting coil part (hereinafter referred to as "OIS coil part") separated from the OIS magnet part, and a supporting part configured to support a shake-correcting movable part (hereinafter referred to as "OIS movable part") including the AF driving part and the OIS magnet part with respect to a shake-correcting fixing part (hereinafter referred to as "OIS fixing part") including the OIS coil part. By swaying the OIS movable part in a plane orthogonal to the optical axis direction with respect to the OIS fixation part by utilizing a driving force of a voice coil motor composed of the OIS magnet part and the OIS coil part, shake correction is performed (so-called barrel shift system). The OIS magnet part can also serve as the AF magnet part, and with such a configuration, the size and the height of the lens driving device can be reduced. In addition, a suspension wire is employed as a supporting part configured to support the OIS movable part with respect to the OIS fixing part, for example.

CITATION LIST

Patent Literature

Japanese Patent Application Laid-Open No. 2013-24938

SUMMARY OF INVENTION

Technical Problem

Preferably, the diameter of the suspension wire is small in view of increasing the sensitivity of the OIS driving part (hereinafter referred to as "OIS sensitivity"). When the diameter of the suspension wire is small, however, the risk of rupture with an impact of dropping or the like is high. In addition, since the suspension wire is easily deflected in this case, the OIS movable part cannot be translated (the lens part is tilted), and the tilt characteristics in shake correction are degraded. The tilt characteristics represent the parallelism of the OIS movable part in shake correction, and the tilt characteristics are represented by the inclination angle of the OIS movable part in movement of the lens part. In this manner, when the diameter of the suspension wire is reduced to increase the OIS sensitivity, the reliability of lens driving device is sacrificed.

In addition, in the conventional AF driving part, the AF movable part is sandwiched by a leaf spring, and as such the structure is complicated with a large number of components, and complex assembly work is required.

An object of the present invention is to provide a lens driving device, and a camera module and a camera mounting device including the lens driving device which can provide improved OIS sensitivity and high reliability, and can simplify the assembly work.

Solution to Problem

A lens driving device according to an embodiment of the present invention includes a shake-correcting driving part, the shake-correcting driving part including: a shake-correcting magnet part disposed at a periphery of a lens part; a shake-correcting coil part disposed separately from the shake-correcting magnet part; and a shake-correcting supporting part configured to support a shake-correcting movable part including the shake-correcting magnet part with respect to a shake-correcting fixing part including the shake-correcting coil part in a state where the shake-correcting movable part is separated from the shake-correcting fixing part in an optical axis direction. The shake-correcting driving part performs shake correction by swaying the shake-correcting movable part with respect to the shake-correcting fixing part in a plane orthogonal to the optical axis direction by use of a driving force of a shake-correcting voice coil motor including the shake-correcting coil part and the shake-correcting magnet part. The shake-correcting supporting part is made of an elastomer material, and has a biaxial hinge structure for supporting the shake-correcting movable part such that the shake-correcting movable part is movable in the plane orthogonal to the optical axis direction. The shake-correcting movable part includes an auto-focusing driving part, the auto-focusing driving part including an auto-focusing coil part disposed at a periphery of the lens part, an auto-focusing magnet part disposed separately from the auto-focusing coil part in a radial direction, and an auto-focusing supporting part configured to support an auto-focusing movable part including the auto-focusing coil part with respect to an auto-focusing fixing part including the auto-focusing magnet part. The auto-focusing driving part performs automatic focusing by moving the auto-focusing movable part in the optical axis direction with respect to the auto-focusing fixing part by use of a driving force of an auto-focusing voice coil motor including the auto-focusing coil part and the auto-focusing magnet part. The auto-focusing supporting part includes a supporting part main body and a stiffening part. The supporting part main body includes a fixed end which is connected to the auto-focusing fixing part, a free end which is connected to the auto-focusing movable part, and an arm which couples the fixed end and the free end. The arm includes two hinge parts formed of an elastomer material, each of the two hinge parts being thinner than a part surrounding the each of the two hinge parts, each of the two hinge parts being configured to operate about a direction orthogonal to the optical axis direction, the arm being configured to be bent along with movement of the auto-focusing movable part in the optical axis direction such that bending directions of the two hinge parts are opposite directions. The stiffening part is formed of a material having a rigidity higher than a rigidity of the elastomer material, the stiffening part being configured to be disposed between the two hinge parts of the arm.

A camera module according to an embodiment of the present invention includes: the lens part, and the above-mentioned lens driving device.

A camera mounting device according to an embodiment of the present invention is an information device or a transport device and the camera mounting device comprises the camera module.

Advantageous Effects of Invention

According to the present invention, the risk of damaging of the shake-correcting supporting part and/or the auto-focusing supporting part due to dropping impact or the like is remarkably low. In addition, the structure is simple in comparison with conventional structures, and the number of the components is small. Furthermore, the influence of the resonance on AF movable part 11 can be remarkably reduced. Accordingly, high reliability can be ensured, and the OIS sensitivity can be increased, while simplifying the assembly work.

BRIEF DESCRIPTION OF DRAWINGS

FIGS. 7A to 7E illustrate states where an AF supporting part and an AF movable part are mounted;

DESCRIPTION OF EMBODIMENTS

Figure 1A:
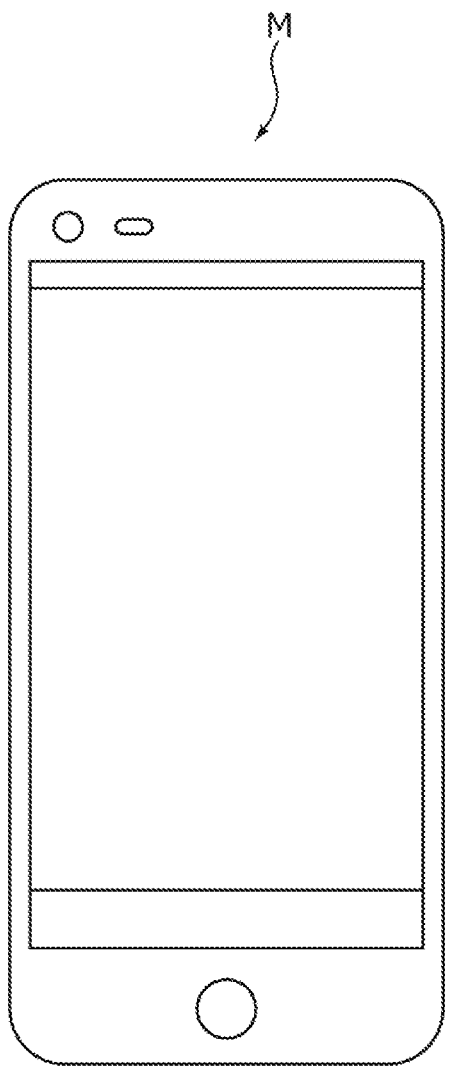
FIGS. 1A and 1B illustrate a smartphone in which a camera module according to an embodiment of the present invention is mounted.
Figure 1B:
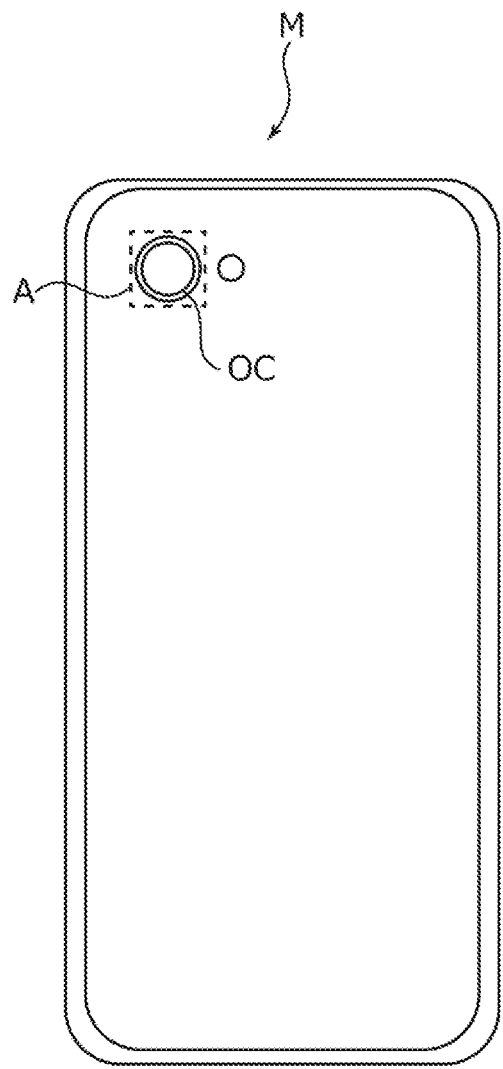

In the following, an embodiment of the present invention is described in detail with reference to the drawings. FIG. 1A and FIG. 1B illustrate smartphone M (camera mounting device) in which camera module A according to the embodiment of the present invention is mounted. FIG. 1A is a front view of smartphone M, and FIG. 1B is a rear view of smartphone M.

For example, smartphone M is provided with camera module A as a back side camera OC. Camera module A has an auto-focusing function and a shake-correcting function, and captures an image without image blurring by automatically performing focusing at the time of capturing a subject and by correcting shake (vibration) at the time of capturing an image.

Figure 2:
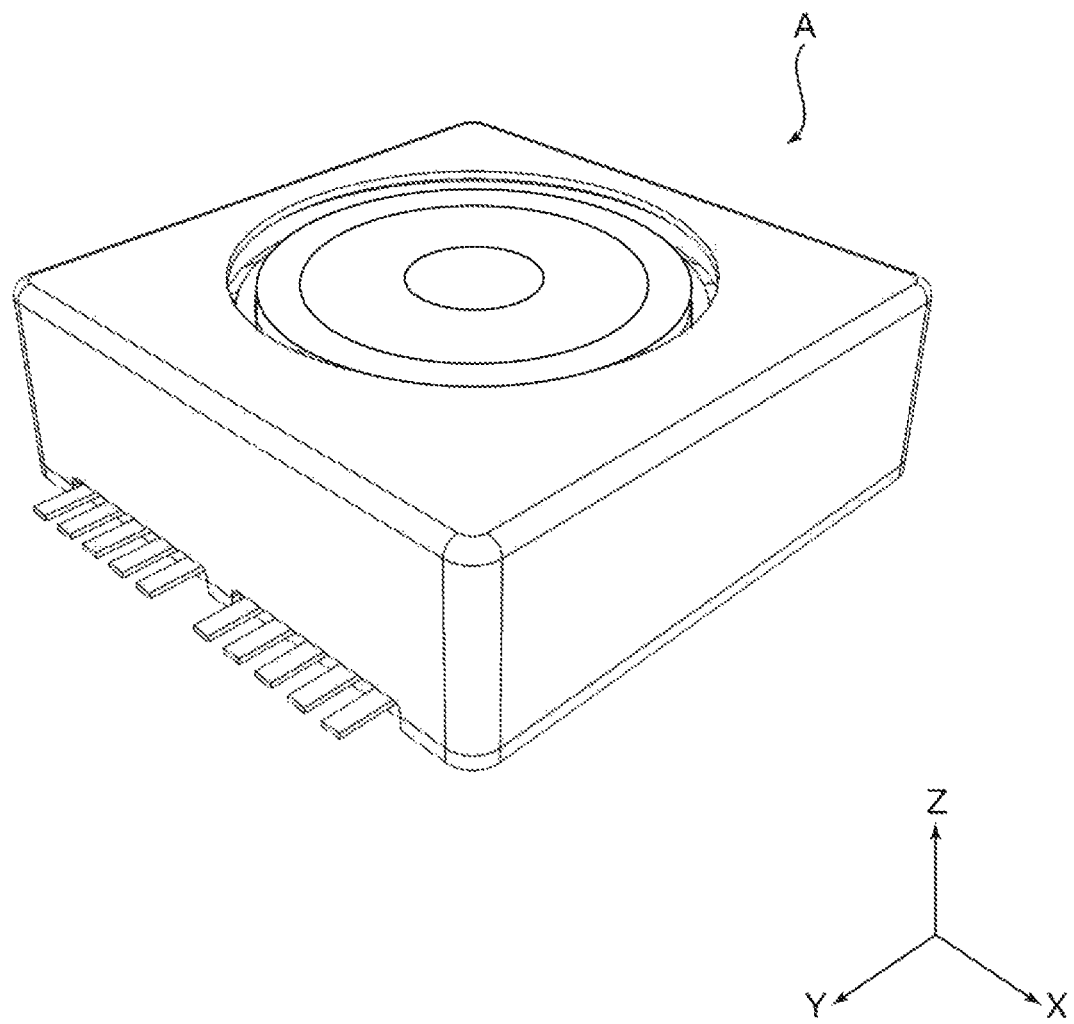
FIG. 2 is a perspective view of an external appearance of the camera module.
Figure 3:
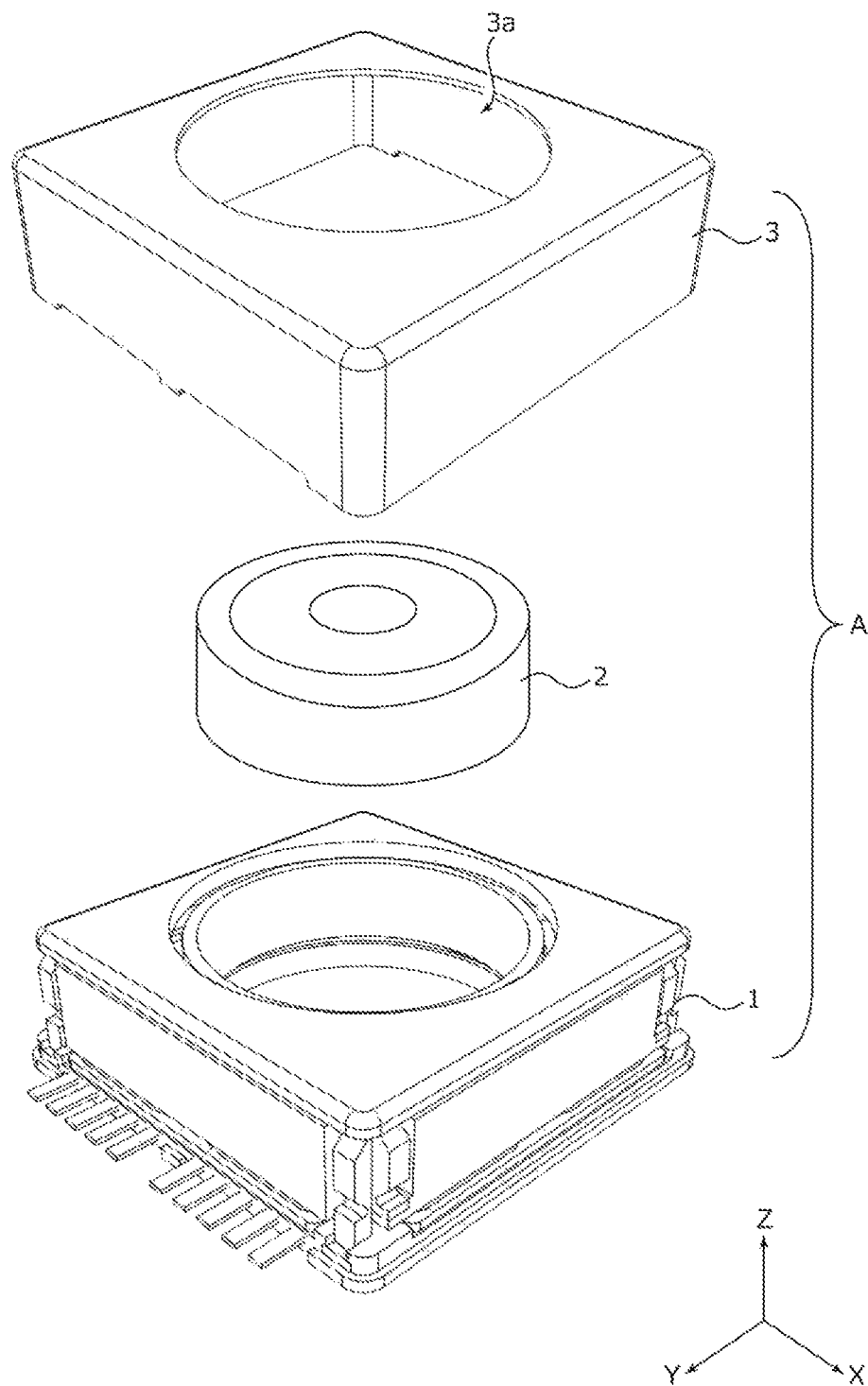
FIG. 3 is an exploded perspective view of the camera module.

FIG. 2 is a perspective view of an external appearance of camera module A. FIG. 3 is an exploded perspective view of camera module A. As illustrated in FIG. 2 and FIG. 3, descriptions will be made with an orthogonal coordinate system (X, Y, Z) in the present embodiment. Also in the drawings described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the optical axis direction, the upper side in the drawing is the light reception side in the optical axis direction (also referred to as "macro position side"), and the lower side is the image capturing side in the optical axis direction (also referred to as "infinity position side"). In addition, the X direction and the Y direction orthogonal to the optical axis direction are referred to as "optical axis orthogonal direction."

Camera module A includes lens part 2 in which a lens is housed in a lens barrel having a cylindrical shape, AF and OIS lens driving device 1, an image capturing part (not illustrated) that captures a subject image imaged with lens part 2, cover 3 that covers the entirety, and the like.

As viewed in the optical axis direction, cover 3 is a capped square cylindrical member having a square shape in plan view. Circular opening 3a is formed in the top surface of shield cover 2. Lens part 2 is exposed to the outside through opening 3a. Cover 3 is fixed to base 22 of OIS fixing part 20 (see FIG. 5) of lens driving device 1. It is to be noted that cover 3 may be formed with a conductive material, and may be grounded through OIS fixing part 20.

The image capturing part (not illustrated) includes an image capturing device (not illustrated), and is disposed on the image capturing side in the optical axis direction of lens driving device 1, that is, the image capturing side in the optical axis direction of OIS fixing part 20. The image capturing device (not illustrated) is composed of, for example, a CCD (charge coupled device) image sensor, a CMOS (complementary metal oxide semiconductor) image sensor, or the like. The image capturing device (not illustrated) captures a subject image imaged between lens part 2, and outputs an electric signal corresponding to the subject image.

Figure 4:
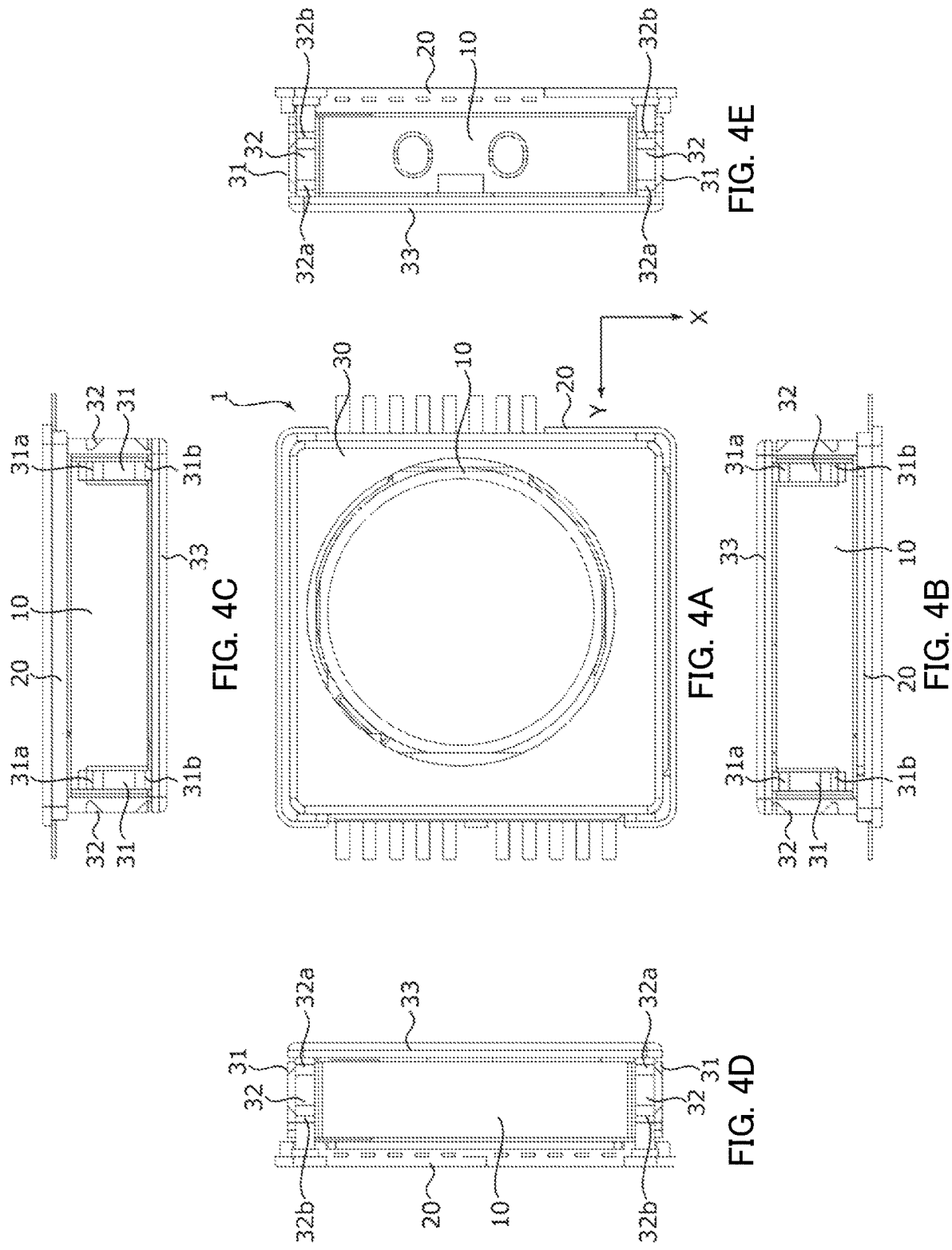
FIGS. 4A to 4E illustrate a lens driving device.
Figure 5:
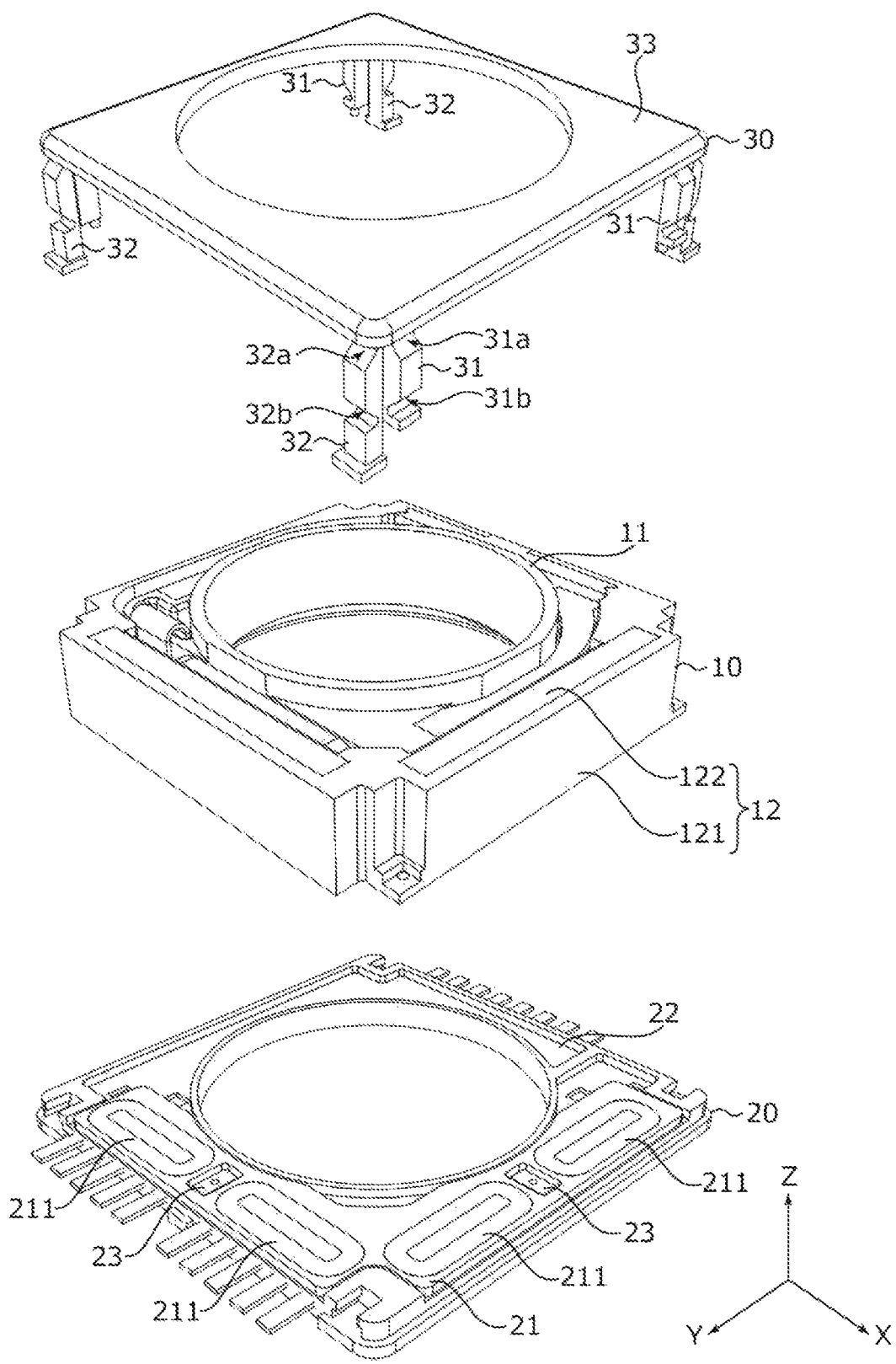
FIG. 5 is an exploded perspective view of the lens driving device.

FIGS. 4A to 4E illustrate lens driving device 1. FIG. 4A is a plan view, FIG. 4B is a front view, FIG. 4C is a rear view, FIG. 4D is a left side view, and FIG. 4E is a right side view. In FIG. 4A to FIG. 4E, only FIG. 4A is provided with a coordinate axis. FIG. 5 is an exploded perspective view of lens driving device 1. As illustrated in FIGS. 4A to 5, lens driving device 1 includes OIS movable part 10, OIS fixing part 20, OIS supporting part 30 and the like.

OIS movable part 10 includes an OIS magnet part serving as a component of the OIS voice coil motor, and sways in the plane orthogonal to the optical axis at the time of shake correction. OIS fixing part 20 includes an OIS coil part serving as a component of the OIS voice coil motor, and supports OIS movable part 10 with OIS supporting part 30. That is, the OIS lens driving part of lens driving device 1 is of a moving magnet type. OIS movable part 10 includes an AF driving part. OIS movable part 10 is separated from OIS fixing part 20 such that OIS movable part 10 can move in the plane orthogonal to the optical axis direction. Here, OIS movable part 10 is disposed on the light reception side relative to OIS fixing part 20 in the optical axis direction, and separated from OIS fixing part 20.

OIS supporting part 30 couples OIS fixing part 20 and OIS movable part 10. In the present embodiment, OIS supporting part 30 is composed of a linking which utilizes the elasticity of an elastomer (hereinafter referred to as "OIS linking member 30"), not a conventional suspension wire. An elastomer is a rubber elastic material, and includes a heat curable elastomer (rubber) and a thermoplastic elastomer (elastic plastic).

As illustrated in FIGS. 4A to 5, OIS linking member 30 includes upper frame body 33, first side supporting member 31, and second side supporting member 32. It is to be noted that first side supporting member 31 and second side supporting member are described as "side supporting members 31 and 32" in descriptions of their common configurations.

Upper frame member 33 is a frame member having a square shape in plan view, and is disposed opposite to base 22 of OIS fixing part 20 in the optical axis direction. Upper frame member 33 is made of a material having a high rigidity. Upper frame member 33 may be made of a resin material or a metal material, and preferably, upper frame member 33 is made of a resin material in view of weight reduction. In particular, a liquid crystal polymer (LCP resin) is favorable as the material of upper frame member 33. With upper frame member 33 made of a liquid crystal polymer, lowering due to the own weight of OIS movable part 10 can be prevented, and favorable tilt characteristics can be ensured while achieving weight reduction.

Side supporting members 31 and 32 are made of an elastomer material. With this configuration, the risk of damaging of side supporting members 31 and 32 with a dropping impact or the like is much lower than the case where a suspension wire is employed as the OIS supporting part. Accordingly, high reliability can be ensured, and the OIS sensitivity of lens driving device 1 can be increased. In addition, since the primary resonance of the OIS driving part can be suppressed by utilizing the attenuation force of the elastomer, the application of the damper is unnecessary unlike the case where the suspension wire is employed, and the assembly work is simplified, thus improving the productivity.

Preferably, the elastomer material is a thermoplastic elastomer (for example, a polyester elastomer) which can provide a small spring constant and can allow for injection molding and mass production. A polyester elastomer has good heat resisting characteristics and good low temperature characteristics, and can have a relatively stable flexibility even with temperature change.

Side supporting members 31 and 32 are columnar members having a strength enough to support OIS movable part 10. Two first side supporting members 31 or two second side supporting members 32 are disposed at each of the four sides of upper frame body 33. It is to be noted that side supporting members 31 and 32 may be plate-shaped members that cover the side surfaces of the OIS movable part. Side supporting members 31 and 32 have a biaxial hinge structure for bending about two axes so as to allow OIS movable part 10 to translate in the plane orthogonal to the optical axis.

To be more specific, first side supporting member 31 includes two Y-hinge parts 31a and 31b that operate about the Y direction, and the thickness of Y-hinge parts 31a and 31b is smaller than that of the portions other than Y-hinge parts 31a and 31b in first side supporting member 31. Here, Y-hinge parts 31a and 31b are hinge grooves formed on the external surface of first side supporting member 31.

The shape of second side supporting member 32 is identical to that of first side supporting member 31. Specifically, second side supporting member 32 includes two X-hinge parts 32a and 32b extending in the X direction, and the thickness of X-hinge parts 32a and 32b is smaller than that of the portions other than X-hinge parts 32a and 32b in second side supporting member 32. Here, X-hinge parts 32a and 32b are hinge grooves formed on the external surface of second side supporting member 321.

Preferably, the hinge grooves of first side supporting member 31 and second side supporting member 32 have, but not limited to, an R-shape. With this configuration, the durability against repetitive bending operations in shake correction is improved.

First side supporting members 31 are suspended from end portions of the two sides extending along the Y direction of upper frame body 33. One end portion of first side supporting member 31 is fixed to upper frame body 33, and the other end portion of first side supporting member 31 is fixed to OIS movable part 10 (here, magnet holder 121).

Second side supporting members 32 are suspended from end portions of two sides extending along the X direction of upper frame body 33. One end portion of second side supporting member 32 is fixed to upper frame body 33, and the other end portion of second side supporting member 32 is fixed to OIS fixing part 20 (here, coil substrate 21).

Upper frame body 33 of OIS linking member 30 is supported by second side supporting member 32 over OIS fixing part 20 on the light reception side in the optical axis direction. In addition, OIS movable part 10 is suspended from upper frame body 33 by first side supporting member 31.

Accordingly, when OIS movable part 10 moves in the Y direction, only second side supporting members 32 are elastically deformed, and first side supporting members 31 are not elastically deformed. When OIS movable part 10 moves in the X direction, only first side supporting members 31 are elastically deformed, and second side supporting members 32 are not elastically deformed. That is, OIS movable part 10 can selectively move in the X direction and the Y direction.

As described above, OIS supporting part 30 includes upper frame body 33 disposed opposite to OIS fixing part 20 in the optical axis direction, first side supporting members 31 disposed opposite to each other in the X direction (a first direction orthogonal to the optical axis direction), each of which couples upper frame body 33 and OIS movable part 10, and second side supporting members 32 disposed opposite to each other in the Y direction (a second direction orthogonal to the optical axis direction and the first direction), each of which couples upper frame body 33 and OIS fixing part 20. First side supporting member 31 includes two Y-hinge parts, 31a and 31b, which are thinner than other portions in first side supporting member 31 and operate about the Y direction. First side supporting member 31 are bent such that the bending directions at Y-hinge parts 31a and 31b are opposite directions when OIS movable part 10 moves in the X direction (see FIG. 10). Second side supporting member 32 includes two X-hinge parts, 32a and 32b, which are thinner than other portions in second side supporting member 32, and operate about the X direction. Second side supporting member 32 are bent such that the bending directions at X-hinge parts 32a and 32b are opposite directions when OIS movable part 10 moves in the Y direction (see FIGS. 11A and 11B).

With OIS supporting part 30 having the mechanical hinge structure utilizing the elasticity of the elastomer, OIS movable part 10 can be moved with a small force, and accordingly power saving can be achieved. In addition, the parallelism of OIS movable part 10 is ensured, and accordingly the tilt characteristics are improved.

Figure 6:
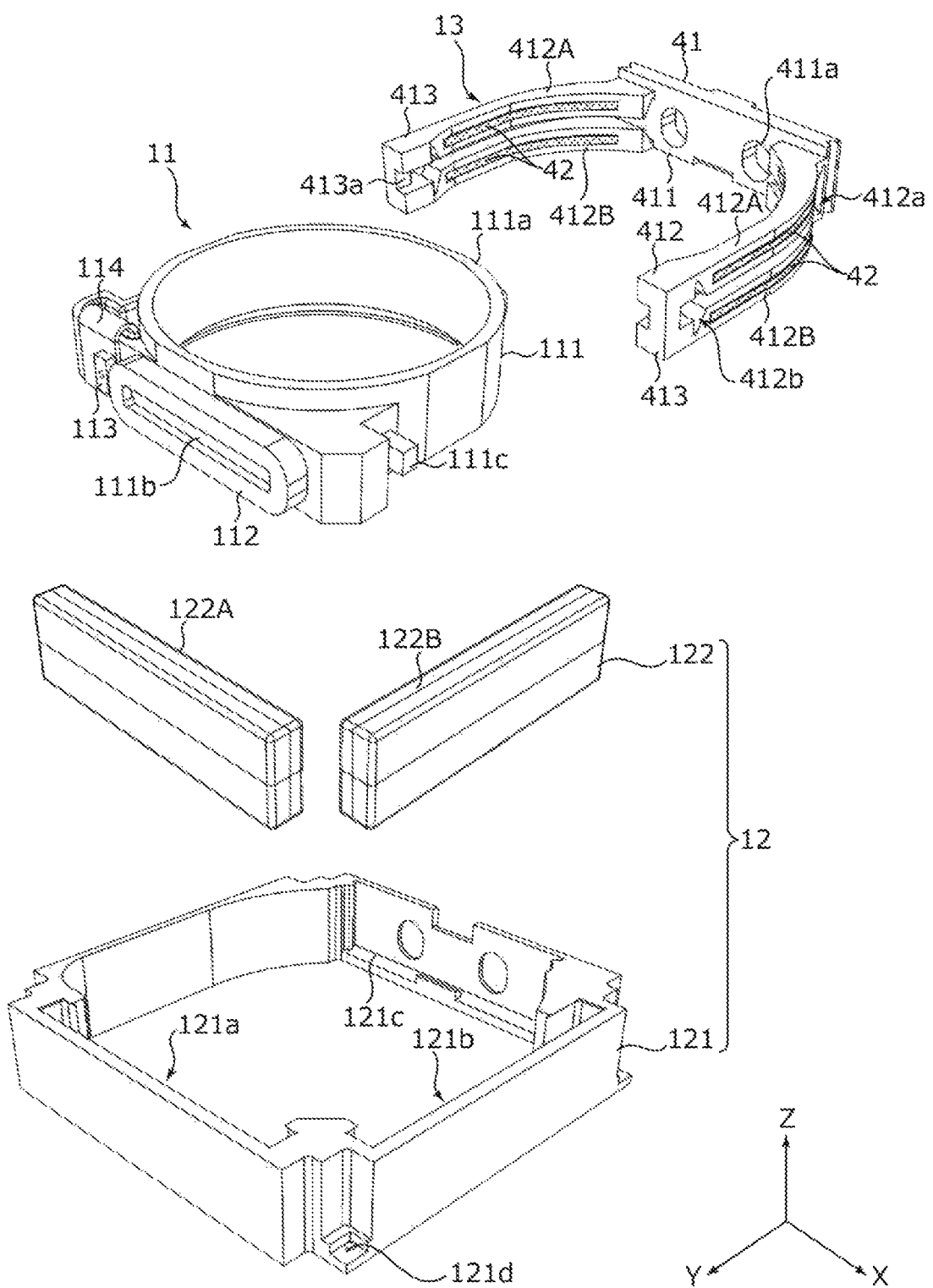
FIG. 6 is an exploded perspective view of an OIS movable part (AF driving part)
Figure 8A:
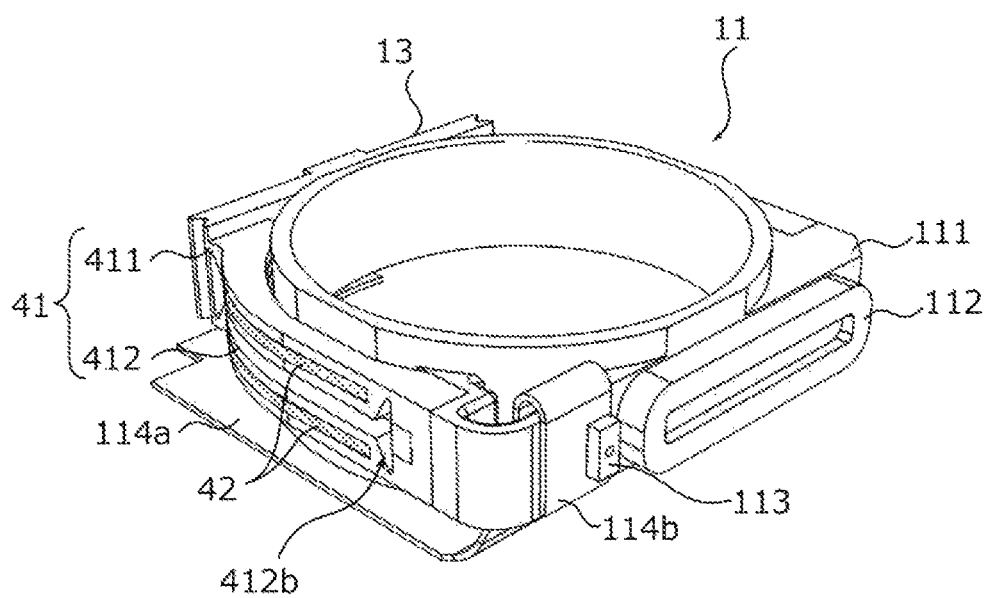
FIGS. 8A and 8B are perspective views illustrating a state where the AF supporting part and the AF movable part are attached.
Figure 8B:
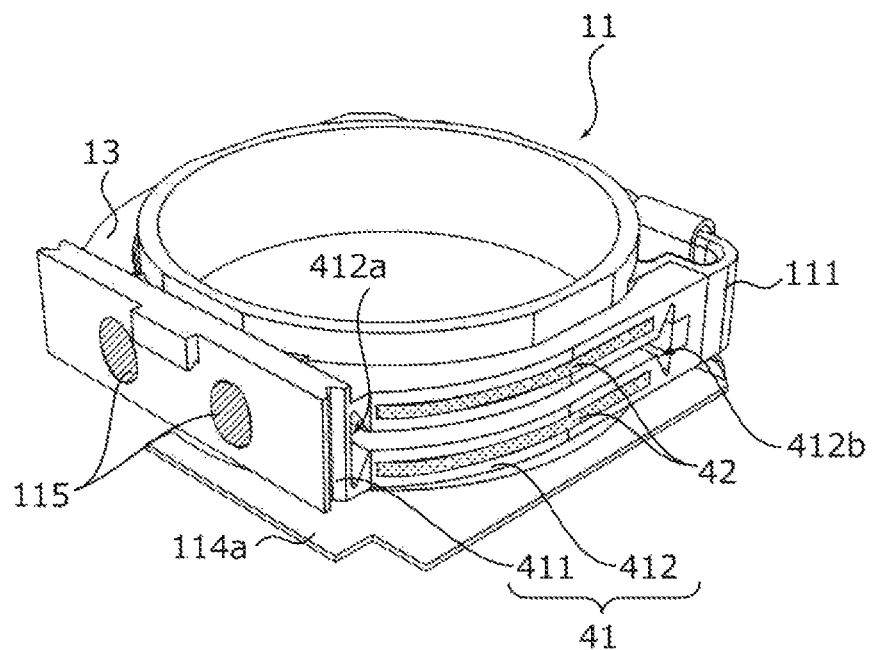

FIG. 6 is an exploded perspective view of OIS movable part 10. FIGS. 7A to 7E illustrate a state where AF supporting part 13 and AF movable part 11 are attached. FIG. 7A is a plan view, FIG. 7B is a front view, FIG. 7C is a rear view, FIG. 7D is a left side view, and FIG. 7E is a right side view. In FIGS. 7A to 7E, only FIG. 7A is provided with a coordinate axis. FIGS. 8A and 8B are perspective views illustrating a state where AF supporting part 13 and AF movable part 11 are attached.

As illustrated in FIG. 6 to FIG. 8B, OIS movable part 10 includes AF movable part 11, AF fixing part 12, AF supporting part 13, and the like. AF movable part 11 is disposed radially inside AF fixing part 12 and is separated from AF fixing part 12. AF movable part 11 is coupled with AF fixing part 12 by AF supporting part 13.

AF movable part 11 includes an AF coil part 112 serving as a component of an AF voice coil motor, and moves in the optical axis direction at the time of focusing. AF fixing part 12 includes an AF magnet part 122A serving as a component of the AF voice coil motor, and supports AF movable part 11 with AF supporting part 13. That is, the AF driving part of lens driving device 1 is of a moving coil type.

AF movable part 11 includes lens holder 111, AF coil part 112, AF position detection part 113 and sensor substrate 114.

Lens holder 111 includes cylindrical lens housing part 111a to which lens part 2 is bonded or fixed by screwing. Lens holder 111 includes, on its side surface along X direction, coil attaching portion 111b to which AF coil part 112 is disposed. Lens holder 111 includes link attaching portions 111c on two side surfaces along the Y direction.

AF coil part 112 is an air-core coil that is energized at the time of focusing, and is wound at coil attaching portion 111b of lens holder 111. Both ends of the winding of AF coil part 112 are connected to sensor substrate 114. AF coil part 112 has an ellipsoidal shape, and disposed such that the coil surface is parallel with the optical axis, and in this case, AF coil part 112 is disposed such that the XZ surface is the coil surface. AF coil part 112 faces magnet part 122 (first magnet 122A).

Sensor substrate 114 is a flexible printed board on which AF position detection part 113 is mounted. Sensor substrate 114 includes flat part 114a disposed on the imaging side in the optical axis direction of lens holder 111, and sensor attaching portion 114b raised from the flat part 114a and bent in a U-shape at a position adjacent to coil attaching portion 111b of lens holder 111. Sensor substrate 114 includes a power-source line (not illustrated) for feeding power to AF coil part 112 and AF position detection part 113, and a signal line (not illustrated) for a detection signal output from AF position detection part 113, and the like. The wirings of sensor substrate 114 are electrically connected to the wirings of base 22.

AF position detection part 113 is, for example, a Hall device which detects a magnetic field by utilizing Hall effect (hereinafter referred to as "AF Hall device 113"). Mainly, AF Hall device 113 detects a magnetic field formed by first magnet 122A. The position of AF movable part 11 in the optical axis direction can be specified based on a detection result of AF Hall device 113. AF Hall device 113 is used in a focusing operation performed by a closed loop control. AF Hall device 113 is mounted in sensor attaching portion 114b of sensor substrate 114.

As described above, AF movable part 11 includes AF Hall device 113 (AF position detection part) which is disposed in the surface (in the drawing, the XZ surface) intersecting the extending direction of arm 412, and configured to detect the position of AF movable part 11 in the optical axis direction based on variation of the magnetic field. It is to be noted that a position detection magnet may be disposed in AF fixing part 12 independently of first magnet 122A.

In the present embodiment, AF movable part 11 is supported by AF supporting part 13 attached to AF fixing part 12 in a cantilever manner. In this case, vibration (resonance) tends to be generated in a direction intersecting the extending direction of arm 412 of AF supporting part 13. Therefore, when AF Hall device 113 is disposed in the surface (in the drawing, the YZ surface) extending along the extending direction of arm 412, it might tend to be influenced by the positional displacement due to the resonance, and consequently the detection accuracy of AF Hall device 113 might be reduced. In contrast, in the present embodiment, AF Hall device 113 does not tend be influenced by the positional displacement due to the resonance since AF Hall device 113 is disposed in the surface intersecting the extending direction of arm 412, and accordingly the position of AF movable part 11 can be detected with high detection accuracy.

AF fixing part 12 includes magnet holder 121 and magnet part 122.

Magnet part 122 includes first magnet 122A and second magnet 122B. First magnet 122A and second magnet 122B are double-sided quadrupole permanent magnets having cuboid shapes (reference numerals are omitted). That is, in first magnet 122A and second magnet 122B, N pole and S pole equally appear in the six surfaces. First magnet 122A is disposed along the X direction so as to face AF coil part 112. Second magnet 122B is disposed along the Y direction.

The sizes and positions of AF coil part 112 and first magnet 122A are set such that magnetic fields which traverse two long side portions in AF coil part 112 in the Y direction are opposite to each other. With this configuration, when AF coil part 112 is energized, Lorentz forces of the same direction in the Z direction are generated at the two long side portions of AF coil part 112.

As described above, first magnet 122A (AF magnet part) has a double-sided quadrupole cuboid shape, and is disposed along the X direction (the first direction orthogonal to the optical axis direction). AF coil part 112 has an ellipsoidal shape, and is disposed such that the coil surface is opposite to first magnet 122A and that the magnetic flux from first magnet 122A oppositely intersects the two long side portions.

The AF voice coil motor is composed of first magnet 122A and AF coil part 112. In addition, the OIS voice coil motor is composed of first magnet 122A, second magnet 122B and OIS coil part 211 (see FIG. 9). That is, first magnet 122A serves as the AF magnet part and as the OIS magnet part.

First magnet 122A and second magnet 122B are used for detecting the position of OIS movable part 10 in the plane orthogonal to the optical axis. In addition, first magnet 122A is used for detecting the position of AF movable part 11 in the optical axis direction. It is to be noted that, in AF fixing part 12 (OIS movable part 10), a position detecting magnet may be disposed independently of first magnet 122A and second magnet 122B.

Magnet holder 121 is a rectangular cylinder member having a space for housing AF movable part 11 and having a substantially square shape in plan view. Magnet holder 121 includes magnet housing part 121a at one side wall along the X direction, and magnet housing part 121b at one side wall along the Y direction. First magnet 122A is disposed in magnet housing part 121a, and second magnet 122B is disposed in magnet housing part 121b.

Magnet holder 121 includes AF link fixing part 121c at the other side wall along the X direction. Magnet holder fixing part 131 of AF linking member 13 is fixed to AF link fixing part 121c.

Magnet holder 121 includes OIS link fixing parts 121d at the end portions (four portions) of the two sides along the Y direction. First side supporting members 31 of OIS linking member 30 are fixed at OIS link fixing parts 121d.

AF supporting part 13 supports AF movable part 11 with respect to AF fixing part 12. In the present embodiment, as with OIS linking member 30, AF supporting part 13 is composed of a linking which utilizes the elasticity of an elastomer (hereinafter referred to as "AF linking member 13"), not a conventional leaf spring. AF linking member 13 is attached to AF fixing part 12 (magnet holder 121) in a cantilever manner.

AF linking member 13 includes supporting part main body 41 and stiffening part 42. Supporting part main body 41 includes magnet holder fixing part 411, arm 412 and lens holder fixing part 413.

Magnet holder fixing part 411 has a shape corresponding to AF link fixing part 121c of magnet holder 121. Magnet holder fixing part 411 includes boss housing part 411a to which restriction boss 111d of lens holder 111 is inserted. Lens holder fixing part 413 has cutout part 413a corresponding to link attaching portion 111c of lens holder 111.

Arm 412 is formed with an elastomer material. Arm 412 has a curved shape along the peripheral surface of lens holder housing part 111a. Each of two arms 412 (first arm and second arm) includes upper arm 412A and lower arm 412B which are spaced away from each other in the optical axis direction. The base end portions of upper arm 412A and lower arm 412B are connected with magnet holder fixing part 411, and indirectly fixed to AF fixing part 12. The tip end portions of upper arm 412A and lower arm 412B are coupled with each other by lens holder fixing part 413.

Upper arm 412A and lower arm 412B have a biaxial hinge structure that is bent about two axes so as to allow AF movable part 11 to translate. With the mechanical hinge structure utilizing the elasticity of the elastomer, AF movable part 11 can be moved with a small force, and accordingly power saving can be achieved.

To be more specific, upper arm 412A and lower arm 412B include two hinge parts, 412a and 412b, which are thinner than the surrounding portion and operate about the X direction. Here, hinge parts 412a and 412b are hinge grooves having an acute angle and formed in the inner surfaces of upper arm 412A and lower arm 412B. Preferably, the shape of the hinge groove is, but not limited to, an R-shape.

Stiffening part 42 is disposed between two hinge parts, 412a and 412b, in arm 412. Stiffening part 42 is formed of a material having higher rigidity than the elastomer material, that is, stiffening part 42 is formed of a material having a small thermal expansion coefficient. Stiffening part 42 is formed by insert molding of a metal piece (for example, a stainless-steel piece), for example. In addition, for example, stiffening part 42 is formed by coinjection molding of resin materials (for example, liquid crystal polymer).

It is to be noted that the size of stiffening part 42 is not limited as long as the resonance of AF movable part 11 can be suppressed, and stiffening part 42 may be provided entirely between hinge part 412a and hinge part 412b.

An elastomer material has a relatively large thermal expansion coefficient, and therefore arm 412 is lengthened in the extending direction as the surrounding temperature increases. When arm 412 is lengthened, the influence of resonance becomes larger. In addition, since the position of AF movable part 11 in the plane orthogonal to the optical axis is shifted by the extended length, shake correction might not be appropriately performed, and reduction in image quality may result. Shake correction in accordance with extension of arm 412 complicates arithmetic processing and increases processing load and therefore is not preferable.

Figure 13A:
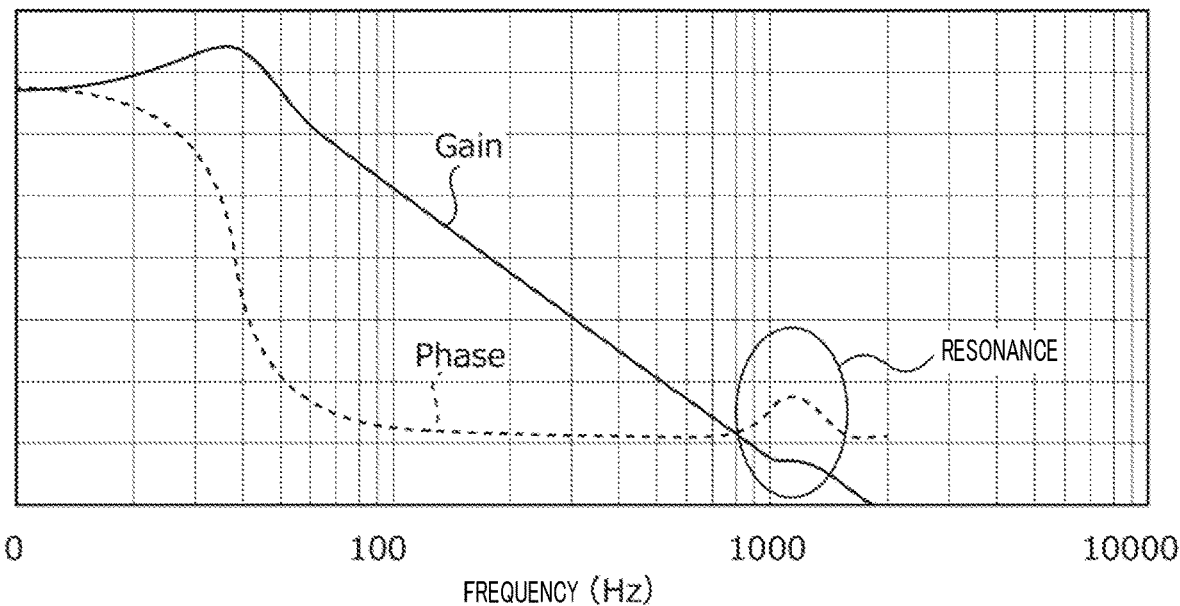
FIGS. 13A and 13B illustrate frequency characteristics of an AF position detection part.
Figure 13B:
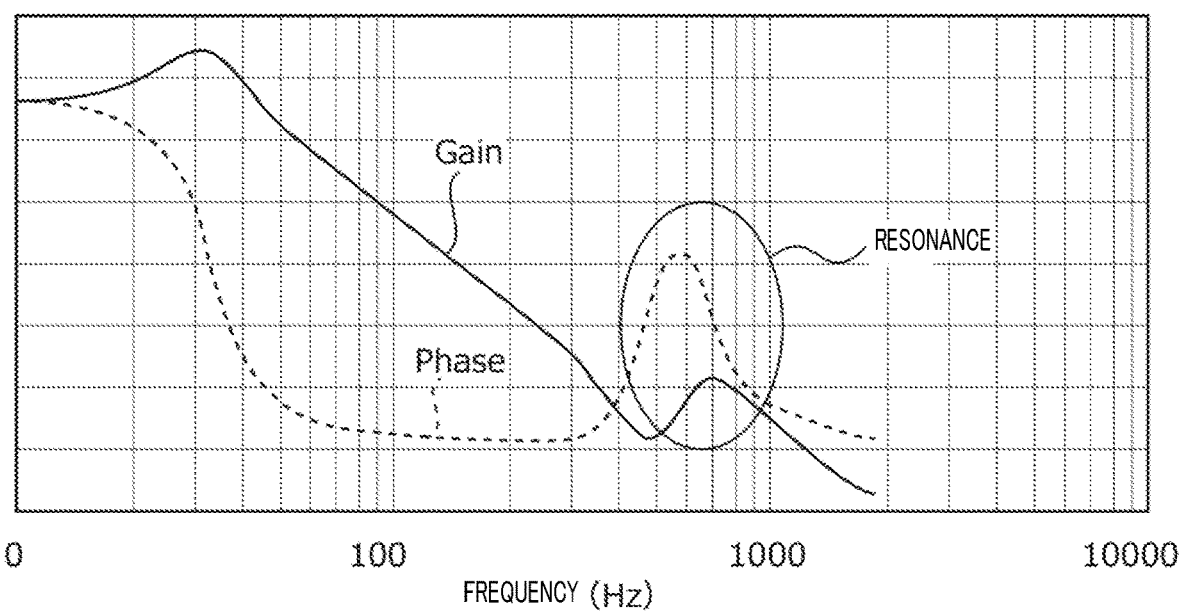

In contrast, in the present embodiment, stiffening part 42 is disposed in arm 412, and thus rigidity is higher than a case that the entirety of arm 412 is formed of an elastomer material. With this configuration, the extension of AF linking member 13 in the arm extending direction is reduced, and accordingly the frequency of the unnecessary resonance becomes higher, and the resonance peak becomes smaller (see FIGS. 13A and 13B). FIGS. 13A and 13B illustrate frequency characteristics of AF position detection part 113. As illustrated in FIGS. 13A and 13B, in the case where stiffening part 42 is disposed, the resonance around 1 kHz is transferred to the higher frequency, and the resonance peak remarkably decreases. In addition, the positional displacement of AF movable part 11 in the plane orthogonal to the optical axis is suppressed. Accordingly, stability is improved in the case where closed loop control is performed based on a detection signal AF position detection part 113 and OIS position detection part 23, and thus the reliability of lens driving device 1 is improved.

Lens holder 111 is disposed inside arm 412. By fitting and bonding cutout part 413a of AF linking member 13 to link attaching portion 111c of lens holder 111, lens holder 111 and AF linking member 13 are coupled with each other. AF linking member 13 is disposed in the proximity of the side surface of lens holder 111, and thus the size of lens driving device 1 in plan view can be reduced, and, AF movable part 11 can be stably supported.

In addition, restriction boss 111d of lens holder 111 is inserted to boss housing part 411a of AF linking member 13. Restriction boss 111d functions as a restriction part that restricts movement of AF movable part 11 in the optical axis direction. That is, when AF movable part 11 moves in the optical axis direction, the upper end (end portion on the light reception side in the optical axis direction) or the lower end (end portion on the imaging side in the optical axis direction) of restriction boss 111d is brought into contact with boss housing part 411a, and thus the movement therefrom is restricted.

The gap between restriction boss 111d and boss housing part 411a is filled with damper 115. With this configuration, the resonance level of AF movable part 11 is further reduced.

As described above, supporting part main body 41 includes magnet holder fixing part 411 (fixed end) that is connected to AF fixing part 12, lens holder fixing part 413 (free end) that is connected to AF movable part 11, and arm 412 that couples magnet holder fixing part 411 and lens holder fixing part 413. Arm 412 includes two hinge parts, 412a and 412b, which are formed of an elastomer material in a thickness smaller than the surrounding part and configured to operate about the X axis (direction orthogonal to the optical axis direction), and bends along with the movement of AF movable part 11 in the optical axis direction such that bending directions at hinge parts 412a and 412b are opposite to each other (see FIGS. 11A and 11B). With this configuration, durability against repetitive bending in auto focusing is improved, and the risk of damaging due to dropping impact or the like is significantly low.

Figure 9:
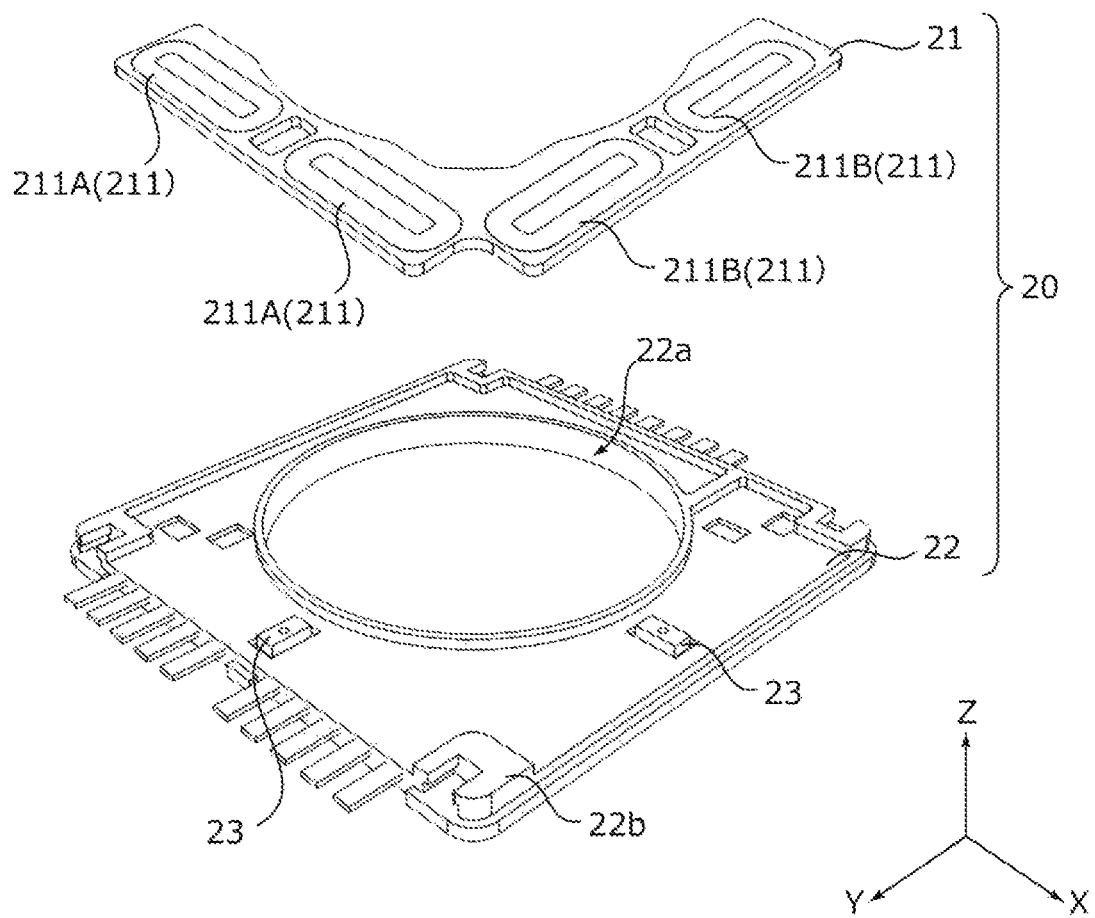
FIG. 9 is an exploded perspective view of an OIS fixing part.

FIG. 9 is an exploded perspective view of OIS fixing part 20. As illustrated in FIG. 9, OIS fixing part 20 includes coil substrate 21, base 22, OIS position detection part 23 and the like.

Coil substrate 21 is a substrate having an L-shape in plan view. With coil substrate 21 having an L-shape, the accepting number from a rectangular substrate increases, and thus cost can be reduced.

Coil substrate 21 includes OIS coil part 211 at a position opposite to magnet part 122 in the optical axis direction. OIS coil part 211 includes first OIS coil 211A and second OIS coil 211B corresponding to first magnet 122A and second magnet 122B.

First OIS coil 211A is composed of two planer elliptical coils. First OIS coil 211A is disposed such that the coil surface is opposite to the imaging side surface of the optical axis direction of first magnet 122A. Second OIS coil 122B is composed of two planer elliptical coils. Second OIS coil 211B is disposed such that the coil surface is opposite to the imaging side surface of second magnet 122B in the optical axis direction.

The sizes and positions of OIS coil part 211 and magnet part 122 are set such that opposite magnetic fields traverse the two long side portions of each OIS coil 211 in the Z direction. With this configuration, when OIS coil part 211 is energized, Lorentz forces in the same direction in the X direction or the Y direction are generated at the two long side portions of OIS coil part 211.

Base 22 is a member having a square shape in plan view, and includes circular opening 22a at the center. Base 22 includes upright wall 22b at the periphery of opening 22a. With upright wall 22b, the coil substrate is positioned with respect to base 22.

OIS position detection part 23 is mounted in base 22. OIS position detection part 23 is, for example, a Hall device (hereinafter referred to as "OIS Hall device 23") that detects a magnetic field by utilizing Hall effect. Each OIS Hall device 23 is disposed at an approximate center of adjacent two sides of base 22, or in other words, at a position corresponding to the separation portion of OIS coil 211.

Mainly, OIS Hall device 23 detects a magnetic field formed by magnet part 122. The position of OIS movable part 10 in the plane orthogonal to the optical axis can be specified based on the detection result of OIS Hall device 23. It is to be noted that a position detecting magnet may be disposed independently of magnet part 122 in OIS movable part 10.

Base 22 includes a power-source line (not illustrated) for feeding power to AF coil part 112, OIS coil part 211, AF position detection part 113 and OIS position detection part 23, a signal line (not illustrated) for a detection signal output from AF position detection part 113 and OIS position detection part 23, and the like. These lines are embedded inside base 22 by insert molding, for example. With this configuration, the print wiring board for mounting OIS position detection part 23 can be omitted, and accordingly weight reduction and downsizing of the camera module can be achieved.

In lens driving device 1, when OIS coil part 211 is energized, a Lorentz force is generated at OIS coil part 211 by interaction between the magnetic field of magnet part 122 and the current flowing through OIS coil part 211 (Fleming's left hand rule). The direction of the Lorentz force is the direction (the Y direction or the X direction) orthogonal to the direction of the magnetic field (the Z direction) and to the direction of the current flowing through the long side portion of OIS coil part 211 (the X direction or the Y direction).

Since OIS coil part 211 is fixed, a reactive force acts on magnet part 122. With this reactive force serving as the driving force of the OIS voice coil motor, OIS movable part 10 including magnet part 122 sways in the XY plane, and thus shake correction is performed. To be more specific, the energization current of shake-correcting coil part 211 is controlled based on a detection signal representing an angular runout from a runout detection part (such as a gyro sensor, not illustrated) so as to offset the angular runout of camera module A. At this time, the translation movement of OIS movable part 10 can be correctly controlled by feeding back the detection result of OIS position detection part 23.

Figure 10A:
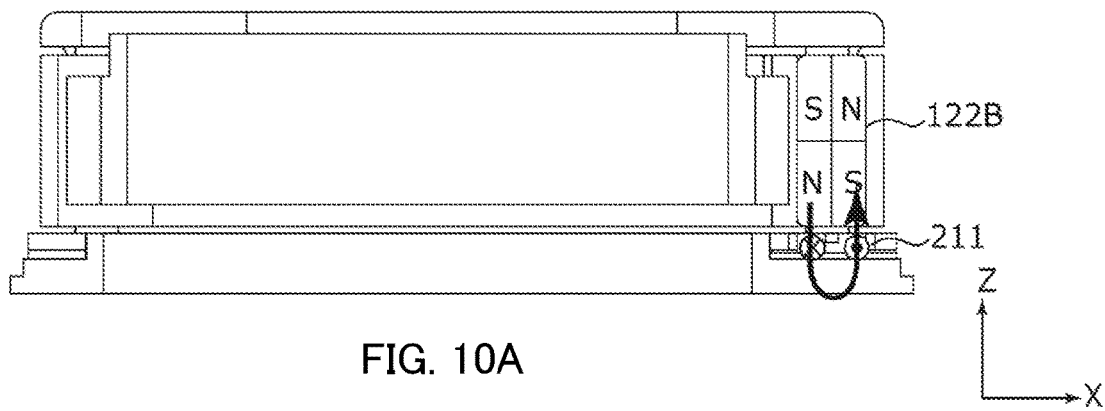
FIGS. 10A and 10B illustrate bending of an OIS supporting part (first side supporting member)
Figure 10B:
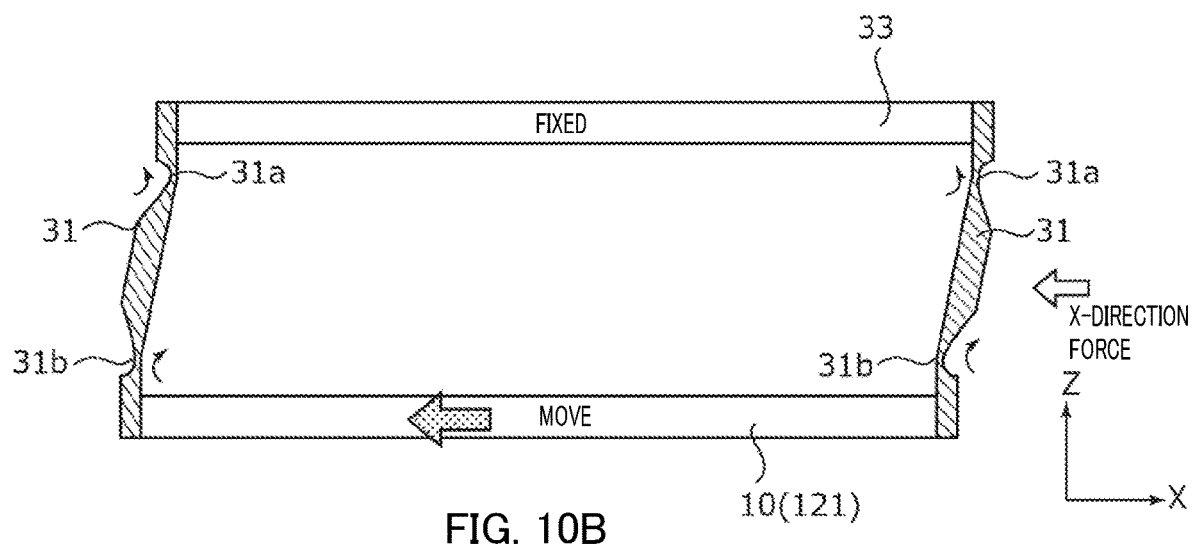

When a force in the X direction acts on OIS movable part 10 as a result of energization of OIS coil part 211 in the manner illustrated in FIG. 10A, first side supporting members 31 of OIS linking member 30 are bent as illustrated in FIG. 10B. Specifically, as illustrated in FIG. 10B, the portion of first side supporting member 31 on the lower side of Y-hinge part 31a moves in the X direction together with OIS movable part 10 (magnet holder 121), while the portion on the upper side of Y-hinge part 31b, which is indirectly connected with OIS fixing part 20 through upper frame body 33 and second side supporting member 32, does not move. That is, first side supporting member 31 is bent such that the bending directions of Y-hinge parts 31a and 31b are opposite directions.

Figure 11A:
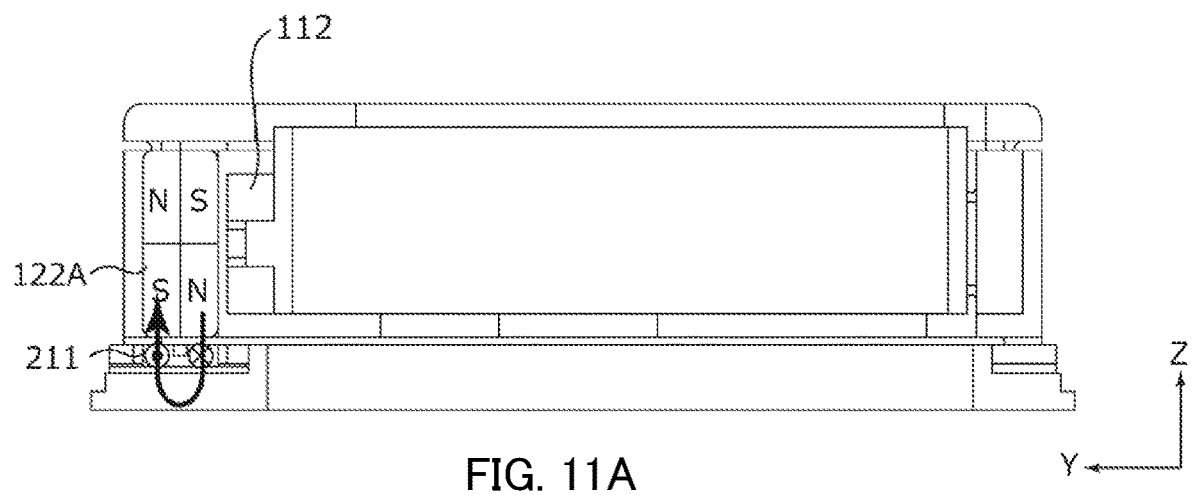
FIGS. 11A and 11B illustrate bending of an OIS supporting part (second side supporting member)
Figure 11B:
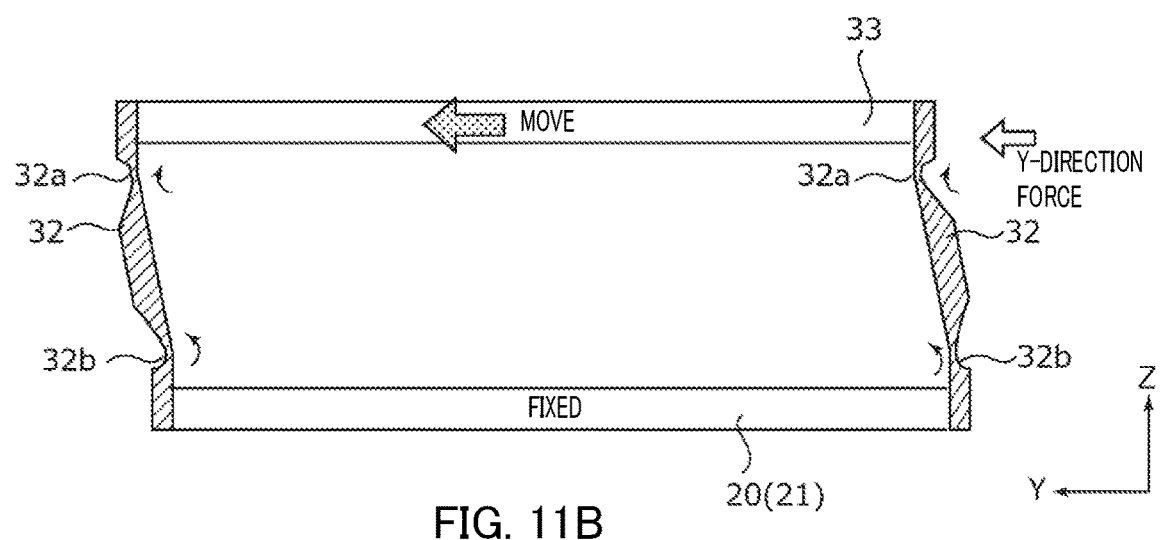

On the other hand, when a force in the Y direction acts on OIS movable part 10 as a result of energization of OIS coil part 211 in the manner illustrated in FIG. 11A, second side supporting member 32 of OIS linking member 30 is bent as illustrated in FIG. 11B. Specifically, the portion of second side supporting member 32 on the upper side of X-hinge part 32a moves in the Y direction together with OIS movable part 10 (magnet holder 121), while the portion on the lower side of X-hinge part 32b, which is connected with base 22 of OIS fixing part 20, does not move. That is, second side supporting member 32 is bent such that the bending directions of X-hinge parts 32a and 32b are opposite directions.

In addition, in lens driving device 1, when AF coil part 112 is energized, a Lorentz force is generated at AF coil part 112 by interaction between the magnetic field of first magnet part 122A and the current flowing through AF coil part 112. The direction of the Lorentz force is a direction (the Z direction) orthogonal to the direction of the magnetic field (the Y direction) and to the direction of the current flowing through the AF coil part 112 (the X direction). With this force serving as the driving force of the AF voice coil motor, AF movable part 11 including AF coil part 112 moves in the optical axis direction, and thus focusing is performed. The focusing position is adjusted by analyzing multiple pieces of image information acquired by an image capturing part (not illustrated) while moving AF movable part 11, and by performing a contrast evaluation, for example.

It is to be noted that, in a non-energization state where focusing is not performed, AF movable part 11 is kept suspended between the infinity position and the macro position with AF linking member 13 (hereinafter referred to as "reference state"), for example. That is, in OIS movable part 10, AF movable part 11 (lens holder 111) is supported such that AF movable part 11 is displaceable in the Z direction in the state where the position of AF movable part 11 with respect to AF fixing part 12 (magnet holder 121) is set by AF linking member 13. At the time of focusing, the direction of the current is controlled based on whether AF movable part 11 is moved from the reference state toward the macro position side or toward the infinity position side. In addition, the value of the current is controlled based on the movement length of AF movable part 11.

Figure 12A:
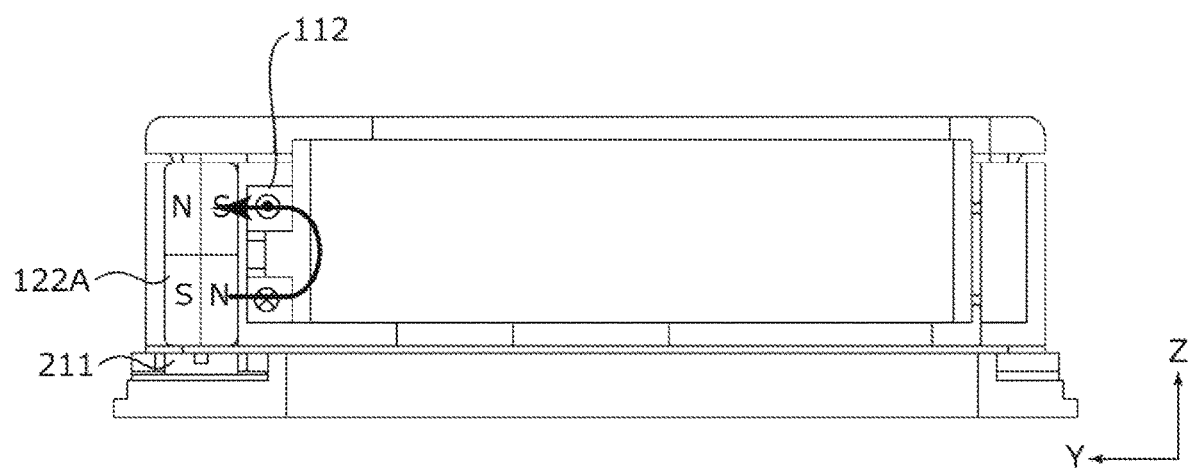
FIGS. 12A and 12B illustrate bending of an AF supporting part (arm)
Figure 12B:
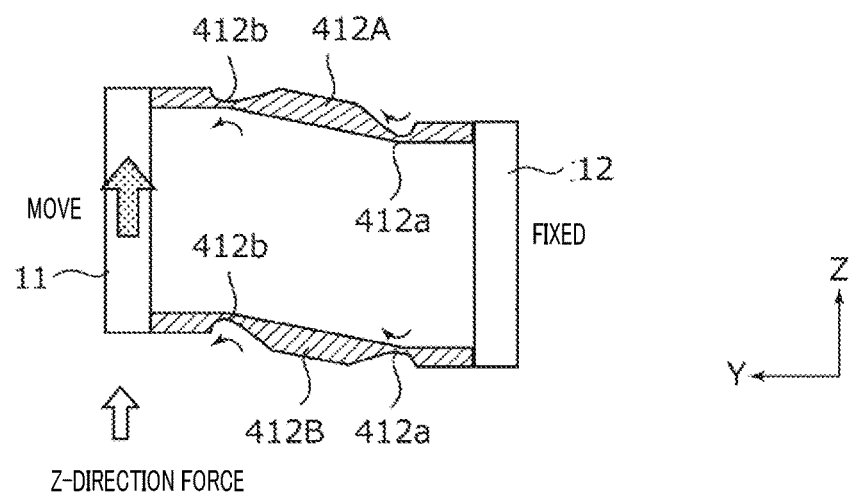

When a force in the Z direction acts on AF movable part 11 as a result of energization of AF coil part 112 in the manner illustrated in FIG. 12A, arm 412 of AF linking member 13 is bent as illustrated in FIG. 12B. Specifically, as illustrated in FIG. 13B, the portion of arm 412 on the left side of hinge part 412b moves in the Z direction together with AF movable part 11, while the portion on the right side of hinge part 412a, which is connected with AF fixing part 12 through magnet holder fixing part 131, does not move. Accordingly, arm 412 is bent such that the bending directions of hinge parts 412a and 412b are opposite directions.

Lens driving device 1 includes a shake-correcting driving part, the shake-correcting driving part including: magnet part 122 (shake-correcting magnet part) disposed at a periphery of lens part 2; OIS coil part 211 (shake-correcting coil part) disposed separately from magnet part 122; and OIS supporting part 30 (shake-correcting supporting part) configured to support OIS movable part 10 (shake-correcting movable part) including magnet part 122 with respect to OIS fixing part 20 (shake-correcting fixing part) including OIS coil part 211 in a state where OIS movable part 10 is separated from OIS fixing part 20 in an optical axis direction. The shake-correcting driving part performs shake correction by swaying OIS movable part 10 with respect to OIS fixing part 20 in a plane orthogonal to the optical axis direction by use of a driving force of a shake-correcting voice coil motor including OIS coil part 211 and magnet part 122. OIS supporting part 30 is made of an elastomer material, and has a biaxial hinge structure for supporting OIS movable part 10 such that OIS movable part 10 is movable in the plane orthogonal to the optical axis direction; and OIS movable part 10 includes an auto-focusing driving part, the auto-focusing driving part including: AF coil part 112 (auto-focusing coil part) disposed at a periphery of lens part 2, first magnet 122A (auto-focusing magnet part) disposed separately from AF coil part 112 in a radial direction, and AF supporting part 13 (auto-focusing supporting part) configured to support AF movable part 11 (auto-focusing movable part) including AF coil part 112 with respect to AF fixing part 12 (auto focus fixing part) including first magnet 122A. The auto-focusing driving part performs automatic focusing by moving AF movable part 11 in the optical axis direction with respect to AF fixing part 12 by use of a driving force of an auto-focusing voice coil motor including AF coil part 112 and first magnet 122A. AF supporting part 13 includes supporting part main body 41 and stiffening part 42. Supporting part main body 41 includes magnet holder fixing part 411 (fixed end) which is connected to AF fixing part 12, lens holder fixing part 413 (free end) which is connected to AF movable part 11, and arm 412 which couples magnet holder fixing part 411 and lens holder fixing part 413. Arm 412 includes two hinge parts formed of an elastomer material, each of the two hinge parts being thinner than a part surrounding the each of two hinge parts 412a and 412b, each of two hinge parts 412a and 412b being configured to operate about a direction orthogonal to the optical axis direction, arm 412 being configured to be bent along with movement of AF movable part 11 in the optical axis direction such that bending directions of two hinge parts 412a and 412b are opposite directions. Stiffening part 42 is formed of a material having a rigidity higher than a rigidity of the elastomer material, stiffening part 42 being configured to be disposed between the two hinge parts of arm 412.

In addition, in lens driving device 1, magnet part 122 is disposed only in adjacent two sides, and therefore, by disposing two lens driving devices 1 inverted by 180°, the magnet parts 122 thereof can be separated away from each other. Accordingly, a dual camera with less magnetic interference can be achieved.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, OIS supporting part 30 and AF supporting part 13 are not limited to the support structure illustrated in the embodiment as long as OIS supporting part 30 and AF supporting part 13 are made of an elastomer material and have a biaxial hinge structure.

In addition, for example, OIS position detection part 23 that detects the position of OIS movable part 10 in the plane orthogonal to the optical axis may be mounted in a sensor substrate electrically connected with base 22.

Figure 14:
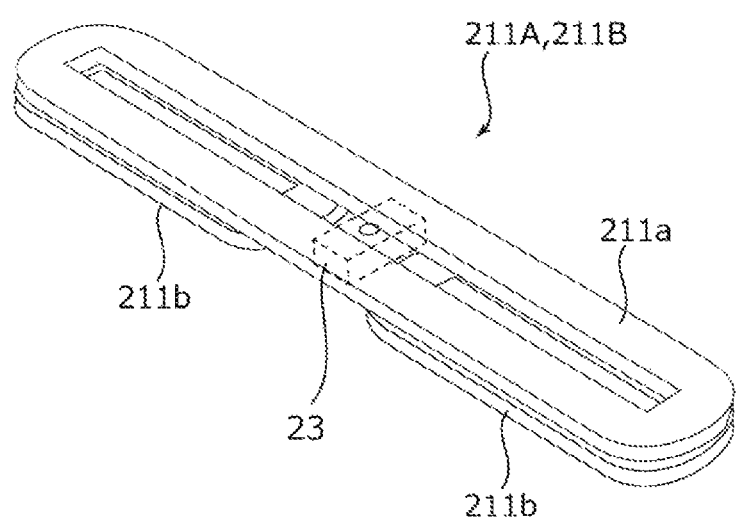
FIG. 14 illustrates an OIS coil part.

In addition, for example, as illustrated in FIG. 14, first OIS coil 211A and second OIS coil 211B may have a two-layer structure including elliptical upper coil layer 211a (first coil layer) and lower coil layer 211b (second coil layer) obtained by dividing upper coil layer 211a into two parts in the longitudinal direction. Upper coil layer 211a and lower coil layer 211b are formed of, for example, one winding, and the current flow directions thereof are identical. It is to be noted that upper coil layer 211a and lower coil layer 211b may be formed of different windings. In this case, the windings are provided such that the current flow directions thereof are identical. OIS Hall device 23 is disposed at a position corresponding to a portion where lower coil layer 211b is divided. The "position corresponding to a portion where lower coil layer 211b is divided" may not only be a position in the divided part, but also be a position shifted from the divided part in the optical axis direction.

Figure 15A:
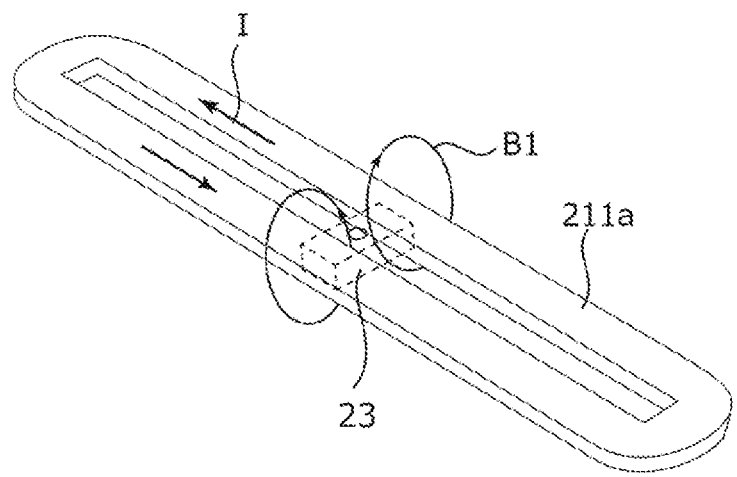
FIGS. 15A and 15B illustrate a relationship between a magnetic flux generated by the OIS coil part and an XY position detection part.
Figure 15B:
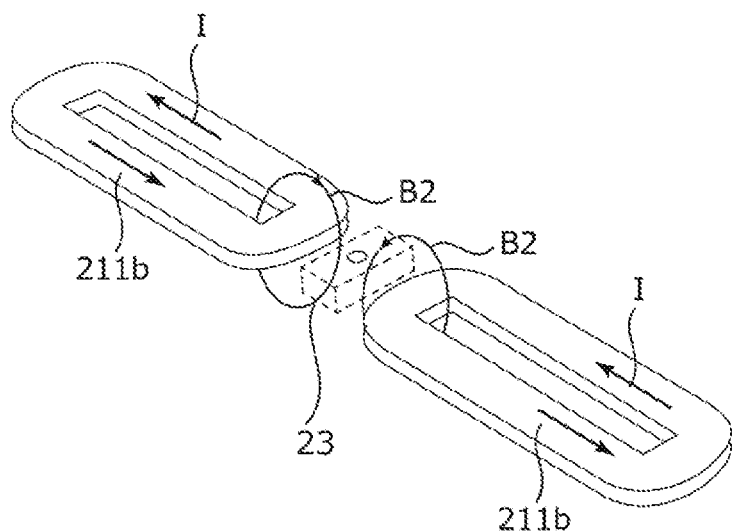

As illustrated in FIGS. 15A and 15B, when current I flows through upper coil layer 211a and lower coil layer 211b in the direction indicated by the arrow, magnetic field B1 generated by upper coil layer 211a traverses OIS Hall device 23 from the lower side to the upper side. Meanwhile, magnetic field B2 generated by lower coil layer 211b traverses OIS Hall device 23 from the upper side to the lower side. Accordingly, the magnetic fields generated by upper coil layer 211a and lower coil layer 211b around OIS Hall device 23 are offset.

With this configuration, at the time of energization of OIS coil part 211, even when a magnetic flux is generated by OIS coil part 211, the magnetic flux that enters OIS Hall device 23 is small, and thus the influence of the magnetic field of OIS coil part 211 on OIS Hall device 23 is suppressed. That is, electrical resonance is suppressed, and further, even when a feedback-control is performed at 150 to 200 Hz, the gain in the low frequency band is improved. Accordingly, the detection sensitivity of OIS Hall device 23 is improved, and the settling time of the OIS driving part is shortened, improving the shake correction accuracy.

In addition, since upper coil layer 211a is not divided, the Lorentz force generated at OIS coil part 211 is large in comparison with a structure in which the entirety of OIS coil part 211 is divided. That is, the sensitivity of shake correction is improved.

In addition, in the case where a metal material is used for stiffening part 42 embedded in arm 412 of AF supporting part 13, this part may be used as a feeding line or a signal line of AF coil part 112 and AF Hall device 113. In this case, a stretchable line having a high flexibility may be used for electrically connecting between the line of base 22 and stiffening part 42, and between stiffening part 42 and AF coil part 112 and AF Hall device 113, for example.

While a smartphone serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, such as a camera-equipped mobile phone, a note-type personal computer, a tablet terminal, a mobile game machine, a webcamera, and a camera-equipped in-vehicle apparatus (for example, a rear-view monitor apparatus or a drive recorder apparatus). In addition, the camera mounting device serving as a transport apparatus is a transport apparatus, such as an automobile, including a camera module and a control section that processes an image obtained with the camera module.

Figure 16A:
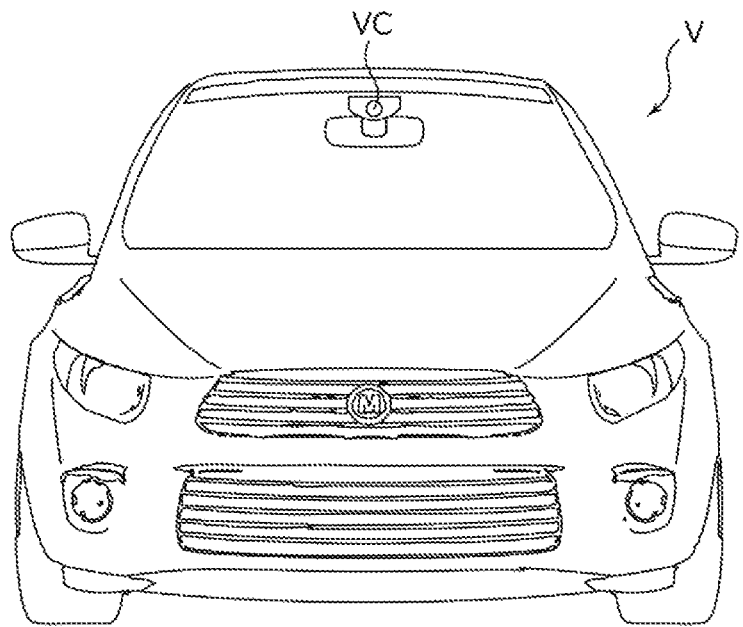
FIGS. 16A and 16B illustrate an automobile as a camera mounting device in which an in-vehicle camera module is mounted.
Figure 16B:
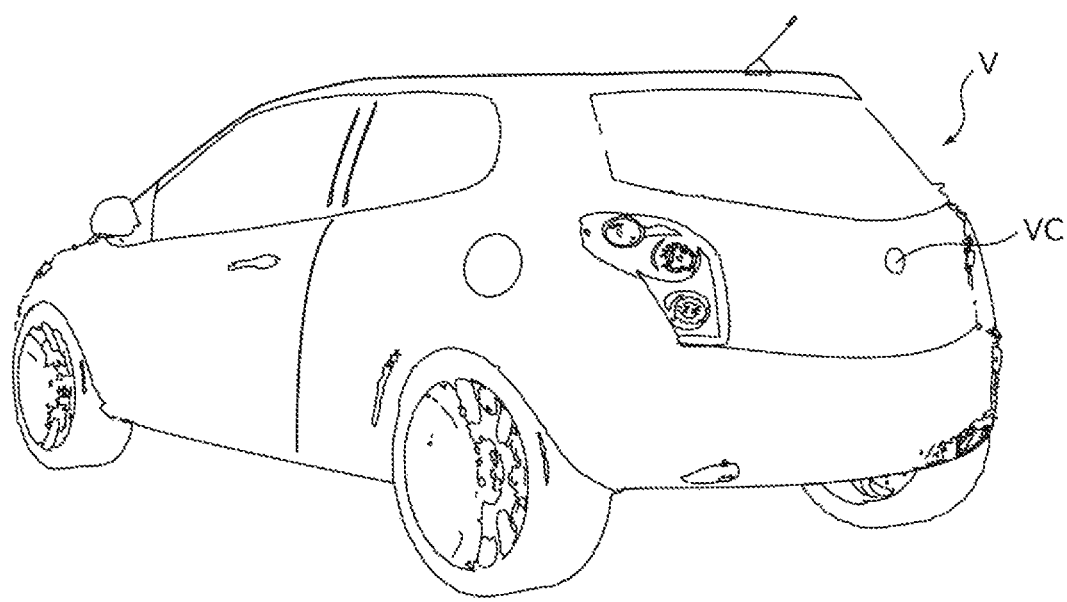

FIG. 16A and FIG. 16B illustrate automobile V serving as a camera mounting device in which an in-vehicle camera module vehicle camera (VC) is mounted. FIG. 16A is a front view of automobile V, and FIG. 16B is a rear perspective view of automobile V. In automobile V, camera module A described in the embodiment is mounted as in-vehicle camera module VC. As illustrated in FIG. 16A and FIG. 16B, in-vehicle camera module VC is attached to the windshield so as to face the front side, or attached to the rear gate so as to face the rear side, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

REFERENCE SIGNS LIST

1 Lens driving device
2 Lens part
3 Cover
10 OIS movable part (Shake-correcting movable part)
11 AF movable part (Auto-focusing movable part)
111 Lens holder
112 AF coil part (Auto-focusing coil part)
113 AF position detection part, AF Hall device
114 Sensor substrate
12 AF fixing part (Auto-focusing fixing part)
121 Magnet holder
122 Magnet part
122A First magnet (Auto-focusing magnet part, shake-correcting magnet part)
122B Second magnet (Shake-correcting magnet part)
13 AF Supporting part, AF linking member (Auto-focusing supporting part)
20 OIS fixing part (Shake-correcting fixing part)
21 Coil substrate
211 OIS coil part (Shake-correcting coil part)
211A First OIS coil
211B Second OIS coil
22 Base
23 OIS position detection part, OIS Hall device
30 OIS supporting part, OIS linking member (Shake-correcting supporting part)
31 First side supporting member
31a, 31b Y-hinge part
32 Second side supporting member
32a, 32b X-hinge part
33 Upper part frame body
41 Supporting part main body
411 Magnet holder fixing part (Fixed end)
412 Arm
412a, 412b Hinge part
413 Lens holder fixing part (Free end)
42 Stiffening part
A Camera module
M Smartphone (Camera mounting device)

I claim:

1. A lens driving device comprising a shake-correcting driving part, the shake-correcting driving part including:
    a shake-correcting magnet part disposed at a periphery of a lens part;
    a shake-correcting coil part disposed separately from the shake-correcting magnet part; and
    a shake-correcting supporting part configured to support a shake-correcting movable part including the shake-correcting magnet part with respect to a shake-correcting fixing part including the shake-correcting coil part in a state where the shake-correcting movable part is separated from the shake-correcting fixing part in an optical axis direction,
    wherein the shake-correcting driving part performs shake correction by swaying the shake-correcting movable part with respect to the shake-correcting fixing part in a plane orthogonal to the optical axis direction by use of a driving force of a shake-correcting voice coil motor including the shake-correcting coil part and the shake-correcting magnet part, wherein the shake-correcting supporting part is made of an elastomer material, and has a biaxial hinge structure for supporting the shake-correcting movable part such that the shake-correcting movable part is movable in the plane orthogonal to the optical axis direction, and wherein the shake-correcting movable part includes an auto-focusing driving part, the auto-focusing driving part including:
- an auto-focusing coil part disposed at a periphery of the lens part,
- an auto-focusing magnet part disposed separately from the auto-focusing coil part in a radial direction, and
- an auto-focusing supporting part configured to support an auto-focusing movable part including the auto-focusing coil part with respect to an auto-focusing fixing part including the auto-focusing magnet part, wherein the auto-focusing driving part performs automatic focusing by moving the auto-focusing movable part in the optical axis direction with respect to the auto-focusing fixing part by use of a driving force of an auto-focusing voice coil motor including the auto-focusing coil part and the auto-focusing magnet part, and wherein the auto-focusing supporting part includes a supporting part main body and a stiffening part, wherein the supporting part main body includes a fixed end which is connected to the auto-focusing fixing part, a free end which is connected to the auto-focusing movable part, and an arm which couples the fixed end and the free end, wherein the arm includes two hinge parts formed of an elastomer material, each of the two hinge parts being thinner than a part surrounding the each of the two hinge parts, each of the two hinge parts being configured to operate about a direction orthogonal to the optical axis direction, the arm being configured to be bent along with movement of the auto-focusing movable part in the optical axis direction such that bending directions of the two hinge parts are opposite directions, and wherein the stiffening part is formed of a material having a rigidity higher than a rigidity of the elastomer material, the stiffening part being configured to be disposed between the two hinge parts of the arm.

2. The lens driving device according to claim 1, wherein the stiffening part is formed of a metal material or a resin material.

3. The lens driving device according to claim 1 or 2, wherein the auto-focusing movable part includes a position detection part disposed in a surface which intersects an extending direction of the arm, the position detection part being configured to detect a position of the auto-focusing movable part in the optical axis direction on a basis of variation of a magnetic field; and wherein the auto-focusing fixing part includes a position detection magnet disposed opposite to the position detection part.

4. The lens driving device according to claim 1, further comprising a damper interposed between the auto-focusing fixing part and the fixed end.

5. A camera module comprising:

the lens part; and the lens driving device according to claim 1.

6. A camera mounting device that is an information device or a transport device, wherein the camera mounting device comprises the camera module according to claim 5.

\* \* \* \* \*